US012204616B2

(12) United States Patent
Zheng (10) Patent No.: US 12,204,616 B2
(45) Date of Patent: Jan. 21, 2025

(54) METHOD AND INTELLIGENT APPARATUS FOR CALLING PERMISSION VERIFICATION OF PROTECTED INTELLIGENT APPLICATION

(71) Applicant: HANGZHOU HIKVISION DIGITAL TECHNOLOGY CO., LTD., Zhejiang (CN)

(72) Inventor: Yiping Zheng, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 302 days.

(21) Appl. No.: 17/798,807

(22) PCT Filed: Mar. 31, 2021

(86) PCT No.: PCT/CN2021/084716
§ 371 (c)(1),
(2) Date: Aug. 10, 2022

(87) PCT Pub. No.: WO2021/197394
PCT Pub. Date: Oct. 7, 2021

(65) Prior Publication Data
US 2023/0089388 A1 Mar. 23, 2023

(30) Foreign Application Priority Data
Apr. 3, 2020 (CN) .......................... 202010259146.3

(51) Int. Cl.
*G06F 21/12* (2013.01)
*G06F 21/51* (2013.01)
*H04L 9/06* (2006.01)

(52) U.S. Cl.
CPC ............ *G06F 21/121* (2013.01); *G06F 21/51* (2013.01); *H04L 9/0618* (2013.01)

(58) Field of Classification Search
CPC ..... G06F 21/51; G06F 21/121; H04L 9/0618; H04L 9/0822; H04L 9/3228; H04L 9/3234
See application file for complete search history.

(56) References Cited

U.S. PATENT DOCUMENTS

| 4,817,140 A | 3/1989 | Chandra et al. |
| 2005/0005134 A1 | 1/2005 | Herrod et al. |

(Continued)

FOREIGN PATENT DOCUMENTS

| CN | 108959943 | 12/2018 |
| CN | 108959943 A | 12/2018 |

(Continued)

OTHER PUBLICATIONS

L. Guan et al., "Building a Trustworthy Execution Environment to Defeat Exploits from both Cyber Space and Physical Space for ARM," in IEEE Transactions on Dependable and Secure Computing, vol. 16, No. 3, pp. 438-453, May 1,-Jun. 2019. (Year: 2019).*

(Continued)

*Primary Examiner* — Kari L Schmidt
(74) *Attorney, Agent, or Firm* — Meunier Carlin & Curfman LLC (57) ABSTRACT

A method and an intelligent apparatus for calling permission verification of a protected intelligent application are provided. Based on the present application, through the calling of the hardware decryption module by the device kernel application, the intelligent apparatus can decrypt the authentication ciphertext in the protected intelligent application by using the implanted-into-kernel key in the device kernel application and the burnt-into-hardware key in the write-protected storage medium, and only when the implanted-into-kernel key is the secondary authentication key obtained by encrypting the second controlled key with the first controlled key and the burnt-into-hardware key is the first (Continued)

controlled key, the correct second controlled key can be obtained to decrypt the authentication ciphertext and the decrypted plaintext consistent with the sample plaintext can be obtained after decryption, so that the protected intelligent application can grant the calling permission to the device kernel application through consistency verification. Thus, the use permission of the protected intelligent application can be limited to the intelligent apparatus with correct key configuration, so as to prevent the malicious piracy of the protected intelligent application running in the illegal apparatus.

11 Claims, 8 Drawing Sheets (56) References Cited

U.S. PATENT DOCUMENTS

| | | | | |
|---|---|---|---|---|
| 2008/0301440 | A1* | 12/2008 | Plouffe, Jr. | G06F 21/575 |
| | | | | 713/164 |
| 2009/0089579 | A1* | 4/2009 | Murase | G06F 21/575 |
| | | | | 713/164 |
| 2012/0159195 | A1* | 6/2012 | von Behren | G06F 21/62 |
| | | | | 713/193 |
| 2015/0326584 | A1* | 11/2015 | Karame | G06F 21/64 |
| | | | | 726/30 |
| 2015/0372806 | A1* | 12/2015 | Carter | G06F 21/6218 |
| | | | | 713/189 |
| 2017/0104585 | A1* | 4/2017 | Cotta | G06F 21/602 |
| 2018/0089454 | A1* | 3/2018 | Iyer | H04L 9/0618 |

FOREIGN PATENT DOCUMENTS

| | | |
|---|---|---|
| CN | 110474767 | 11/2019 |
| CN | 110879875 | 3/2020 |
| CN | 110932853 | 3/2020 |

OTHER PUBLICATIONS

Weidong Shi, Hsien-Hsin S. Lee, Chenghuai Lu, and Mrinmoy Ghosh. 2005. Towards the issues in architectural support for protection of software execution. SIGARCH Comput. Archit. News 33, 1 (Mar. 2005), 6-15. (Year: 2005).*

Hu, Wei, et al. "An overview of hardware security and trust: Threats, countermeasures, and design tools." IEEE Transactions on Computer-Aided Design of Integrated Circuits and Systems 40.6 (2020): 1010-1038. (Year: 2020).*

Extended European Search Report from corresponding European Patent Application No. 21778860.3, dated Jun. 6, 2023.

* cited by examiner

METHOD AND INTELLIGENT APPARATUS FOR CALLING PERMISSION VERIFICATION OF PROTECTED INTELLIGENT APPLICATION

CROSS REFERENCE TO RELATED APPLICATIONS

This application is a § 371 U.S. National Stage Application of International Patent App. No. PCT/CN2021/084716, filed on Mar. 31, 2021, which claims priority to and the benefit of Chinese Patent App. No. 202010259146.3, filed Apr. 3, 2020.

TECHNICAL FIELD

The present application relates to copyright protection of an intelligent application, and in particular, to a method and an intelligent apparatus for calling permission verification of a protected intelligent application.

BACKGROUND

With the popularization of intellectualized applications, various intelligent applications have emerged as require. However, how to effectively protect the copyright of intelligent applications and limit the use permission of intelligent applications to intelligent apparatuses within the specified authorization range has become a technical problem to be solved in the existing technology.

SUMMARY

In view of this, the embodiments of the present application provide a method for calling permission verification of a protected intelligent application and an intelligent apparatus applying the method respectively, which each contributes to limit the use permission of the protected intelligent application to the intelligent apparatus within the specified authorization range. Specifically, the technical solutions are as follows.

In one embodiment, it is provided a method for calling permission verification of a protected intelligent application, wherein when the protected intelligent application is loaded into an intelligent apparatus, the method for calling permission verification comprises the following steps performed by the device kernel application of the intelligent apparatus:

obtaining authentication ciphertext in the protected intelligent application;

calling a hardware decryption module, and delivering an implanted-into-kernel key pre-implanted in the device kernel application and the obtained authentication ciphertext to the hardware decryption module, so that the hardware decryption module decrypts the implanted-into-kernel key by using a burnt-into-hardware key in a write-protected storage medium of the intelligent apparatus, and decrypts the authentication ciphertext by using a decryption key obtained by decrypting the implanted-into-kernel key; wherein, when the implanted-into-kernel key is a secondary authentication key obtained by encrypting a second controlled key with a first controlled key and when the burnt-into-hardware key is the first controlled key, a decryption key obtained by decrypting the implanted-into-kernel key is the second controlled key;

providing decrypted plaintext obtained by decrypting the authentication ciphertext returned by the called hardware decryption module to the protected intelligent application, so that the protected intelligent application decides whether to grant a calling permission to the device kernel application by verifying consistency between the decrypted plaintext and sample plaintext; wherein the authentication ciphertext is obtained by encrypting the sample plaintext with the second controlled key, when the decryption key obtained by decrypting the implanted-into-kernel key is the second controlled key, the decrypted plaintext obtained by decrypting the authentication ciphertext is consistent with the sample plaintext inaccessible by the device kernel application in the protected intelligent application.

Optionally, the authentication ciphertext is obtained by performing deceptive encryption on the sample plaintext with the secondary authentication key as an input key and the second controlled key as a real key.

Optionally, the secondary authentication key is obtained by performing a first encryption algorithm based encryption operation on the second controlled key with the first controlled key;

the authentication ciphertext is obtained by performing a second encryption algorithm based encryption operation on the sample plaintext with the second controlled key;

the hardware decryption module uses the burnt-into-hardware key to perform a first decryption algorithm based decryption operation on the implanted-into-kernel key, and uses the decryption key obtained by decrypting the implanted-into-kernel key to perform a second decryption algorithm based decryption operation on the authentication ciphertext;

wherein the first decryption algorithm is a reverse algorithm of the first encryption algorithm, and the second decryption algorithm is a reverse algorithm of the second encryption algorithm.

Optionally, the authentication ciphertext is obtained by performing a first decryption algorithm based deceptive encryption on the sample plaintext, wherein the deceptive encryption uses the first controlled key to perform the first decryption algorithm based decryption operation on an input key, and uses a deception key obtained by decrypting the input key as a real key to perform the second encryption algorithm based encryption operation.

Optionally, before the protected intelligent application is loaded into the intelligent apparatus on which the device kernel application runs, the method for calling permission verification further comprises following steps performed by the device kernel application of the intelligent apparatus:

receiving encrypted key data provided by a production line burning device;

performing a decryption operation on the encrypted key data;

burning on the write-protected storage medium of the intelligent apparatus by using key data obtained by decrypting the encrypted key data to form a burnt-into-hardware key; wherein, when the encrypted key data provided by the production line burning device comes from a key server, the key data obtained by decrypting the encrypted key data is the first controlled key;

discarding the key data after burning is completed.

Optionally, access permission of the key server by the production line burning device is authenticated by a hot-plug encryption device plugged into the production line burning device.

Optionally, before receiving the encrypted key data provided by the burning device, the method further comprises:
providing the production line burning device with verification information pre-implanted in the device kernel application in response to verification detection of the production line burning device.

Optionally, a control right of the first controlled key belongs to a first controller;
a control right of the second controlled key belongs to a second controller which is different from the first controller; and
the first controller and the second controller are both different from a first developer to which the device kernel application belongs and a second developer to which the protected intelligent application belongs.

Optionally, wherein the write-protected storage medium of the intelligent apparatus is an OTP storage medium.

In another embodiment, an intelligent apparatus comprising an application carrying module, a hardware decryption module and a write-protected storage medium is provided, wherein the application carrying module is used to load and run a device kernel application, and the device kernel application is configured to perform the method for calling permission verification as described in the above embodiment when the protected intelligent application is recorded in the application carrying module.

In another embodiment, a non-transitory computer-readable storage medium is provided, which stores instructions that, when executed by a processor, cause the processor to load a device kernel application and trigger the device kernel application to perform the method for calling permission verification as described in the above embodiment.

In another embodiment, a key deployment method is provided, the method comprising:
obtaining a first controlled key from a first controller and burning the first controlled key into a write-protected storage medium of a specified intelligent apparatus as a burnt-into-hardware key;
obtaining a second controlled key from a second controller and using the second controlled key as an encryption key of the protected intelligent application;
encrypting the second controlled key with the first controlled key to obtain a secondary authentication key, and implant the secondary authentication key into a device kernel application of the specified intelligent apparatus as an implanted-into-kernel key.

Based on the above embodiments, through the calling of the hardware decryption module by the device kernel application, the intelligent apparatus can decrypt the authentication ciphertext in the protected intelligent application by using the implanted-into-kernel key in the device kernel application and the burnt-into-hardware key in the write-protected storage medium, and only when the implanted-into-kernel key is the secondary authentication key obtained by encrypting the second controlled key with the first controlled key and the burnt-into-hardware key is the first controlled key, the correct second controlled key can be obtained to decrypt the authentication ciphertext and the decrypted plaintext consistent with the sample plaintext can be obtained after decryption, so that the protected intelligent application can grant the calling permission to the device kernel application through consistency verification. Thus, the use permission of the protected intelligent application can be limited to the intelligent apparatus which is correctly configured with the secondary authentication key and burnt with the first controlled key, so as to prevent the malicious piracy of the protected intelligent application running in the illegal apparatus.

BRIEF DESCRIPTION OF DRAWINGS

In order to more clearly describe the technical solution of the embodiments of the present application and the prior art, drawings needed in the embodiments and the prior art will be briefly described below. Obviously, the drawings described below are for only some embodiments of the present application, other drawings can be obtained by one of ordinary skills in the art based on the drawings illustrated herein without any creative efforts.

DETAILED DESCRIPTION

In order to make objectives, technical solutions and advantages of the present application more apparent, the present application now will be described in detail with reference to the accompanying drawings and by way of examples. Obviously, the embodiments described herein are only some of the embodiments of the present application instead of all of them. All other embodiments obtained by those of ordinary skills in the art based on the embodiments herein without any creative efforts are within the scope of the present application.

Figure 1:
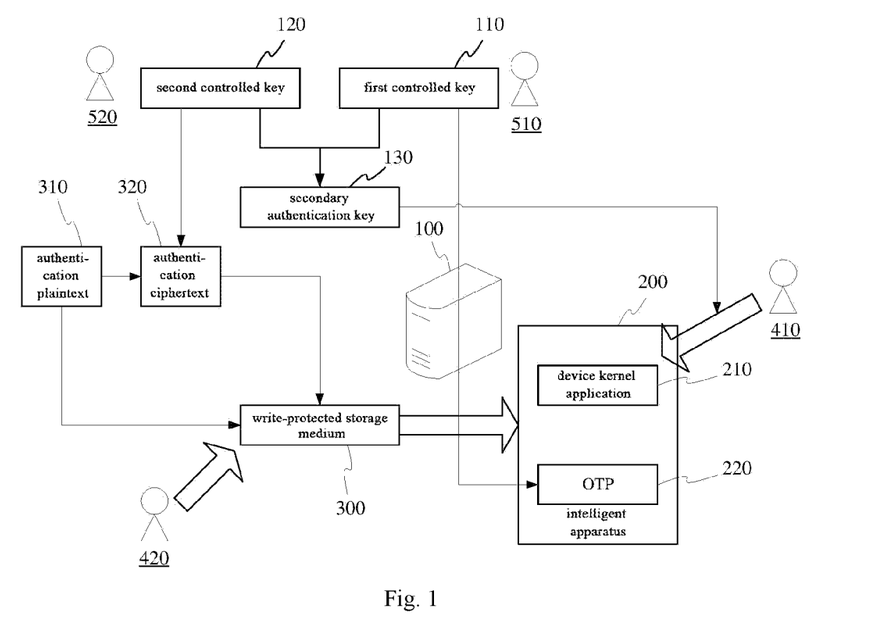
FIG. 1 is a schematic diagram illustrating the principle of a legal key deployment scheme in an embodiment of the present application.

FIG. 1 is a schematic diagram of a legal key deployment scheme (i.e., a key deployment method) in an embodiment of the present application. Referring to FIG. 1, in order to realize the loading and operation of a protected intelligent application (such as an intelligent algorithm library) in an intelligent apparatus (such as a smart card) within the specified authorization range, the legal key deployment scheme in this embodiment provides three keys, namely the first controlled key, Key_root 110 (also known as a root key), the second controlled key, Key_alg 120 (also known as an original intelligent apparatus key), and the secondary authentication key, Key_ladder 130 (also known as a work key).

The first controlled key Key_root 110 can be an AES (Advanced Encryption Standard) key. The first controlled key Key_root 110 can be burnt into the write-protected storage medium 220 of the intelligent apparatus 200 as a legal burnt-into-hardware key in the intelligent apparatus 200, wherein the write-protected storage medium 220 can be a medium such as an OTP (One Time Programmable) storage medium that can prevent the tampering of the burnt-into-hardware key. The control right of the first controlled key Key_root 110 belongs to the first manager 510 (the manager is also referred to as a controller in the present application), which is different from the first developer 410 to which the device kernel application 210 belongs and from the second developer 420 to which the protected intelligent application 300 belongs. In order to facilitate the confidentiality and isolation of the first controlled key Key_root 110 from the first developer 410 and the second developer 420, the first controlled key Key_root 110 may use the key server 100 with controlled access permission as a transfer carrier.

The second controlled key Key_alg 120 may also be an AES key, the second controlled key Key_alg 120 may be a legal encryption key by means of which ciphertext in the protected intelligent application is obtained through encryption, and the control right of the second controlled key Key_alg 120 belongs to the second manager 520, which is not only different from the first manager 510, but also different from the first developer 410 to which the device kernel application 210 belongs and from the second developer 420 to which the protected intelligent application 300 belongs.

The secondary authentication key Key_ladder 130 may be a secondary authentication key obtained by using the first controlled key Key_root 110 to encrypt the second controlled key Key_alg 120 based on Key Ladder mechanism. The secondary authentication key Key_ladder 130 may be shared within the first developer 410 to which the device kernel application 210 belongs, and the secondary authentication key Key_ladder 130 may be implanted in the device kernel application 210 by the first developer 410 as an implanted-into-kernel key.

Figure 2:
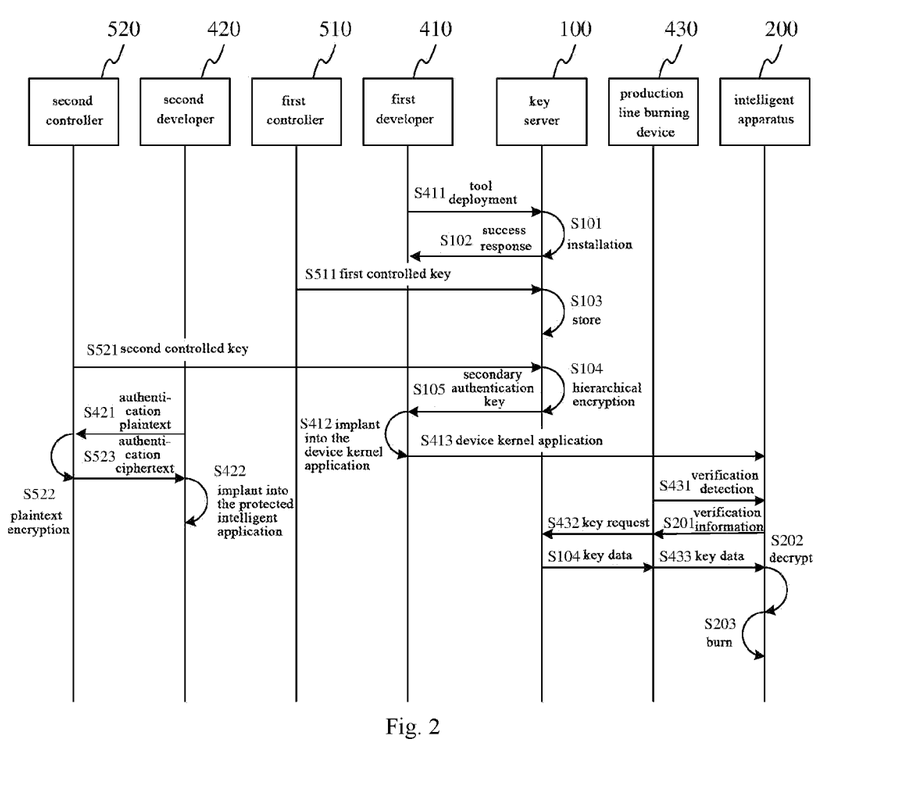
FIG. 2 is an example flow diagram of the legal key deployment scheme shown in FIG. 1 in the present application.

FIG. 2 is an example flow diagram of the legal key deployment scheme shown in FIG. 1. Referring to FIG. 2, in an example of legal key deployment:

the first developer 410 (for example, a development group of the belonger of the device kernel application) may deploy the key assignment tool in the key server 100 (S411), wherein the deployment location of the key assignment tool in the key server 100 may be known to only the first developer 410.

After the key server 100 successfully completes the installation of the key assignment tool (S101), the first developer 410 will then receive a success response returned by the key server 100 (S102). At this time, the key server 100 has the ability to act as a transfer carrier of the first controlled key Key_root 110. The key server 100 can receive the first controlled key uploaded by the first controller and the second controlled key uploaded by the second controller by using the key assignment tool; take the first controlled key as an encryption key to encrypt the second controlled key in order to obtain the secondary authentication key, and then use the key assignment tool to deliver the secondary authentication key to the first developer, so as to realize the transfer of the first controlled key.

The first controller 510 (for example, the key administrator of the belonger of the device kernel application) may upload the first controlled key Key_root 110 to the key server 100 (S511) so that the key server 100 can locally store the first controlled key Key_root 110 (S103). Wherein, the storage location of the first controlled key Key_root 110 in the key server 100 may be specified by the first controller 510 and be known to only the first controller 510. In an example, Company A entrusts Company B to develop a device kernel application, then Company B is the first developer and Company A is the first controller.

The second controller 520 (for example, the key administrator of the belonger of the protected intelligent application) may upload the second controlled key Key_alg 120 to the key server 100 (S521), so that the key server 100 can call the deployed key assignment tool, and encrypt the uploaded second controlled key Key_alg 120 with the locally stored first controlled key Key_root 110 in order to obtain the hierarchical encryption mechanism based secondary authentication key Key_ladder 130 (S104). The hierarchical encryption mechanism here refers to that the secondary authentication key is key information of two levels that is obtained by encrypting the second controlled key with the first controlled key. In an example, Company C entrusts company D to develop an intelligent application, then Company D is the second developer and Company C is the second controller.

Thereafter, the key server 100 may deliver the hierarchical encryption mechanism based secondary authentication key Key_ladder 130 to the first developer 410 (S105), so that the first developer 410 may retain the secondary authentication key Key_ladder 130, implant the secondary authentication key Key_ladder 130 into the device kernel application (S412), and then hand over the device kernel application implanted with the secondary authentication key Key_ladder 130 to the production line to be unchangeably loaded to the intelligent apparatus 200 (S413).

The intelligent apparatus 200 with the unchangeably loaded device kernel application will go through subsequent production processes in the production line, comprising the burning process of using the burnt-into-hardware key of a production line burning device 430. That is, the production line burning device 430 may initiate the verification detection of the intelligent apparatus 200 (S431), and the device kernel application in the intelligent apparatus 200 may provide the production line burning device 430 with verification information pre-embedded in the device kernel application (S201) in response to the verification detection of the production line burning device 430. Wherein the verification information is used to verify the legitimacy and version of the device kernel application, so as to determine the legitimacy of the intelligent apparatus 200.

When detecting that the intelligent apparatus 200 is a legal apparatus with a correct version according to the verification information, the production line burning device 430 may initiate a key request to the key server 100 (S432). Wherein, the access permission of the production line burning device 430 to the key server 100 may be authenticated by the hot-plug encryption device (such as encryption dog) plugged into the production line burning device 430. Therefore, after receiving the key request and passing the authentication of the key request, the key server 100 will send the encrypted key data to the production line burning device 430 (S106). The key server 100 and the production line burning device 430 are devices from different manufacturers. The access permission of the production line burning device 430 is authenticated by the key server 100, so as to prevent illegal manufacturers from fraudulently using the production line burning device 430 to defraud the secondary authentication key.

The production line burning device 430 does not have the ability to decrypt the key data. Therefore, the production line burning device 430 will forward the encrypted key data to the intelligent apparatus 200 (S433).

The device kernel application of the intelligent apparatus 200 receives the encrypted key data provided by the production line burning device 430, and may perform a decryption operation on the encrypted key data according to the reverse algorithm (e. g., deobfuscation algorithm) of the encryption algorithm (e. g., obfuscation algorithm) used by the key server 100 (S202), and burn on the write-protected storage medium (such as the OTP storage medium) of the intelligent apparatus 200 the key data (in this case, the first controlled key Key_root 110) obtained by decrypting the encrypted key data to form a burnt-into-hardware key (S203). After the burning is completed, the device kernel application of the intelligent apparatus 200 may discard the key data used during the burning.

The second developer 420 (for example, the development group of the belonger of the protected intelligent application) may provide the authentication plaintext to the second controller 520 (S421) for encryption based on the second controlled key Key_alg 120 (S522). After receiving the authentication ciphertext provided by the second controller 520 (S523), the second developer 420 can implant the authentication ciphertext and authentication plaintext into the protected intelligent application (S422), wherein the authentication ciphertext is implanted in the protected intelligent application with unrestricted access, while the authentication plaintext is implanted in the way of preventing access from the device kernel application. After encrypting the authentication plaintext with the second controlled key to obtain the authentication ciphertext, the second controller sends the authentication ciphertext to the second developer. The second developer implants the authentication ciphertext into the protected intelligent application with unrestricted access, and implants the authentication plaintext into the protected intelligent application in the way of preventing access from the device kernel application.

Figure 3:
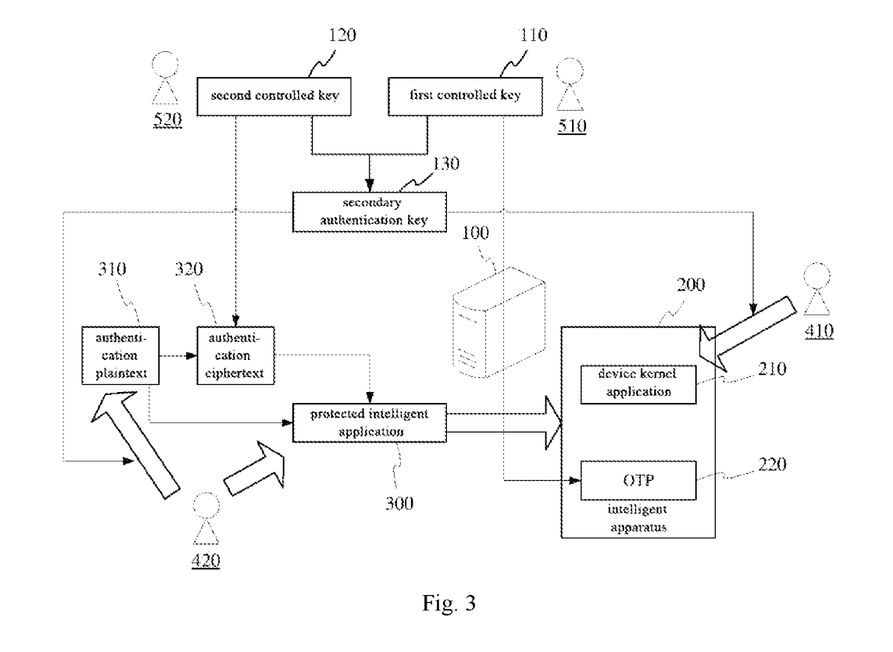
FIG. 3 is a schematic diagram illustrating the optimized principle of the legal key deployment scheme shown in FIG. 1 in the present application.
Figure 4:
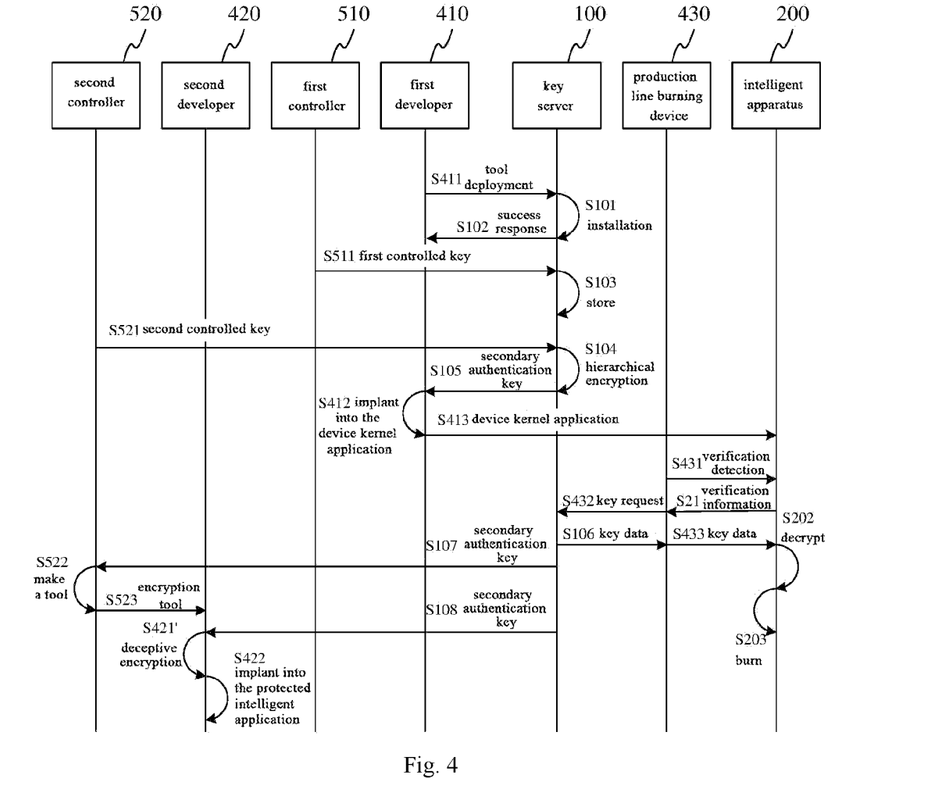
FIG. 4 is an example flow diagram of the legal key deployment scheme shown in FIG. 3 in the present application.

FIG. 3 is a schematic diagram of the optimized principle of the legal key deployment scheme shown in FIG. 1. FIG. 4 is an example flow diagram of the legal key deployment scheme shown in FIG. 3. As an extended solution, the authentication ciphertext generation process based on the encryption of the authentication plaintext can also be completed in the second developer 420. For example, the key server 100 can also deliver the secondary authentication key Key_ladder 130 to the second controller 520 (S107) and the second developer 420 (S108) respectively for retention.

The second controller 520 can make a plaintext encryption tool for deceptive encryption (S522) and provide it to the second developer 420 (S523), wherein the deceptive encryption takes the secondary authentication key Key_ladder 130 as an input key and the second controlled key Key_alg 120 as a real key to perform the encryption operation. The deceptive encryption here refers to an encryption operation in which the input key is different from the real key, that is, encryption is performed not with the input secondary authentication key but with the second controlled key.

Thus, the second developer 420 can use the retained secondary authentication key Key_ladder 130 and the plaintext encryption tool provided by the second controller 520 to encrypt the authentication plaintext (S421') in order to obtain the authentication ciphertext encrypted with the second controlled key Key_alg 120 as the real key. After that, the second developer 420 can implant the authentication ciphertext and authentication plaintext into the protected intelligent application (S422), wherein the authentication ciphertext is implanted in the protected intelligent application with unrestricted access, while the authentication plaintext is implanted in the way of preventing access from the device kernel application.

The above description of the legal key deployment aims to facilitate the understanding of the key relationship of the first controlled key Key_root 110 (also known as the root key) to be burnt in the intelligent apparatus, the second controlled key Key_alg 120 (also known as the original intelligent apparatus key) to generate the authentication ciphertext of the protected intelligent application, and the secondary authentication key Key_ladder 130 to trigger decryption verification or further to trigger ciphertext encryption. It can be understood that the operation process, all identities and the details of key assignment in the above legal key deployment should not be considered as necessary restrictions on the key relationship.

Hereinafter, the method for calling permission verification of the protected intelligent application will be described in detail in combination with the first controlled key Key_root 110, the second controlled key Key_alg 120 and the secondary authentication key Key_ladder 130 with the above key relationship.

In the present application, the specific type of intelligent apparatus is not limited. The intelligent apparatus can be any device that can load and run intelligent applications. In one example, the intelligent apparatus can be an intelligent camera or a hard disk video recorder, etc., and the protected intelligent application can be an intelligent analysis algorithm (for example, an algorithm such as a target recognition algorithm or a target trajectory analysis algorithm; or a client of a device such as a camera or hard disk video recorder, etc.). In one example, the intelligent apparatus can be a UAV (unmanned aerial vehicle) equipped with a pan-tilt, and the protected intelligent application can be an application that controls the pan-tilt, etc.

Figure 5:
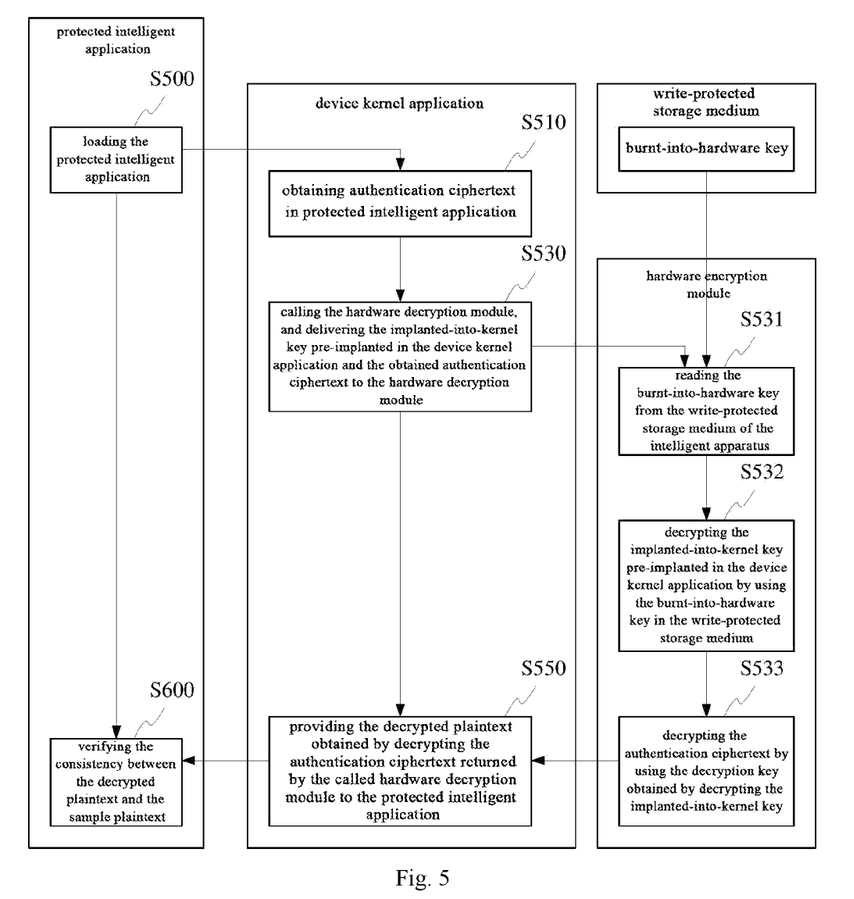
FIG. 5 is an exemplary flow diagram of the method for calling permission verification of a protected intelligent application in an embodiment of the present application.

FIG. 5 is an exemplary flow diagram of the method for calling permission verification of a protected intelligent application in an embodiment of the present application. Referring to FIG. 5, when the protected intelligent application is loaded into the intelligent apparatus (S500), the method for calling permission verification of the protected intelligent application in this embodiment may comprise the following steps performed by the device kernel application of the intelligent apparatus:

S510: obtaining authentication ciphertext in the protected intelligent application;

S530: calling a hardware decryption module, and delivering the implanted-into-kernel key pre-implanted in the device kernel application and the obtained authentication ciphertext to the hardware decryption module, so that the hardware decryption module:

at S531, reads a burnt-into-hardware key from the write-protected storage medium of the intelligent apparatus;

at S532, decrypts the implanted-into-kernel key pre-implanted in the device kernel application by using the burnt-into-hardware key in the write-protected storage medium; and at S533, decrypts the authentication ciphertext by using the decryption key obtained by decrypting the implanted-into-kernel key.

For example, the secondary authentication key Key_ladder can be obtained by performing a first encryption algorithm based encryption operation on the second controlled key Key_alg with the first controlled key Key_root, and the authentication ciphertext is obtained by encrypting sample plaintext (i.e. the authentication plaintext) with the second controlled key Key_alg. Accordingly, the hardware decryption module can use burnt-into-hardware key to perform the first decryption algorithm (the reverse algorithm of the first encryption algorithm) based decryption operation on the implanted-into-kernel key, and the hardware decryption module can use the decryption key obtained by decrypting the implanted-into-kernel key to perform the second decryption algorithm (the reverse algorithm of the second encryption algorithm) based decryption operation on the authentication ciphertext.

Thus, when the implanted-into-kernel key is the secondary authentication key Key_ladder obtained by encrypting the second controlled key Key_alg with the first controlled key Key_root and when the burnt-into-hardware key is the first controlled key Key_root, the decryption key obtained by decrypting the implanted-into-kernel key is the second controlled key Key_alg.

If the authentication ciphertext is obtained by performing deceptive encryption on the sample plaintext with the secondary authentication key Key_ladder as an input key and the second controlled key Key_alg as a real key, the deceptive encryption can use the first controlled key Key_root to perform the first decryption algorithm (the reverse algorithm of the first encryption algorithm) based decryption operation on the input key, and use the deception key (the second controlled key Key_alg) obtained by decrypting the input key as a real key to perform the encryption operation based on the second encryption algorithm.

S550: providing the decrypted plaintext obtained by decrypting the authentication ciphertext returned by the called hardware decryption module to the protected intelligent application, so that the protected intelligent application decides whether to grant the calling permission to the device kernel application by verifying the consistency between the decrypted plaintext and the sample plaintext at S600.

Wherein, when the decryption key obtained by decrypting the implanted-into-kernel key is the second controlled key Key_alg, the decrypted plaintext obtained by decrypting the authentication ciphertext is consistent with the sample plaintext inaccessible from the device kernel application in the protected intelligent application.

Based on the above process, through the calling of the hardware decryption module by the device kernel application, the intelligent apparatus can decrypt the authentication ciphertext in the protected intelligent application by using the implanted-into-kernel key in the device kernel application and the burnt-into-hardware key in the write-protected storage medium, and:

only when the implanted-into-kernel key is the secondary authentication key Key_ladder obtained by encrypting the second controlled key Key_alg with the first controlled key Key_root and the burnt-into-hardware key is the first controlled key Key_root, the correct second controlled key Key_alg can be obtained to decrypt the authentication ciphertext and the decrypted plaintext consistent with the sample plaintext can be obtained after decryption, so that the protected intelligent application can grant the calling permission to the device kernel application through consistency verification.

Thus, the use permission of the protected intelligent application can be limited to the intelligent apparatus which is correctly configured with the secondary authentication key Key_ladder and burnt with the first controlled key Key_root, so as to prevent the malicious piracy of the protected intelligent application running in the illegal apparatus.

Figure 6:
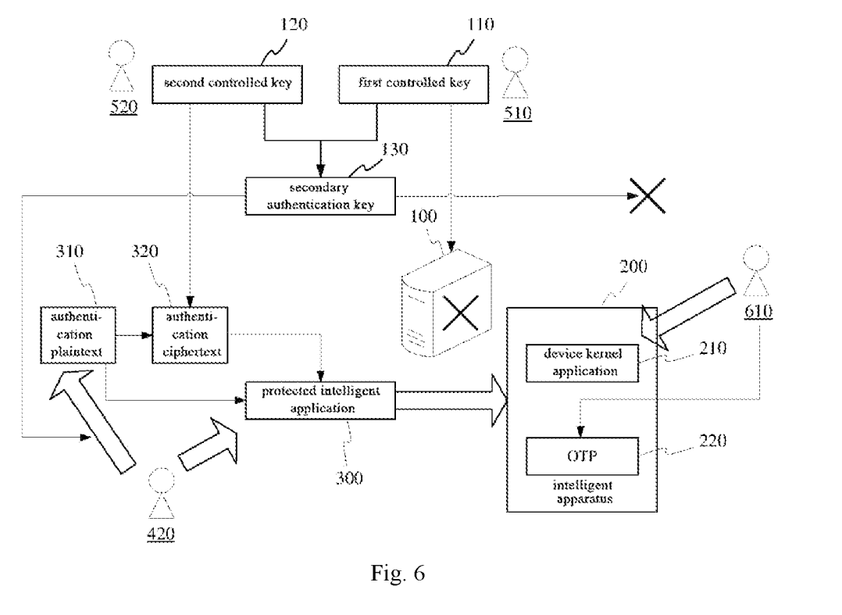
FIG. 6 is a schematic diagram of the key illegal deployment that can be prevented by the method for calling permission verification as shown in FIG. 5 in the present application.

FIG. 6 is a schematic diagram of the key illegal deployment that can be prevented by the method for calling permission verification as shown in FIG. 1. Referring to FIG. 6, if a pirate 610 imitates the hardware and the loaded device kernel application of the intelligent apparatus, it is difficult for the pirate 610 to obtain both the secondary authentication key Key_ladder and the first controlled key Key_root at the same time, so that the counterfeit intelligent apparatus cannot obtain the calling permission of the protected application 300.

Figure 7:
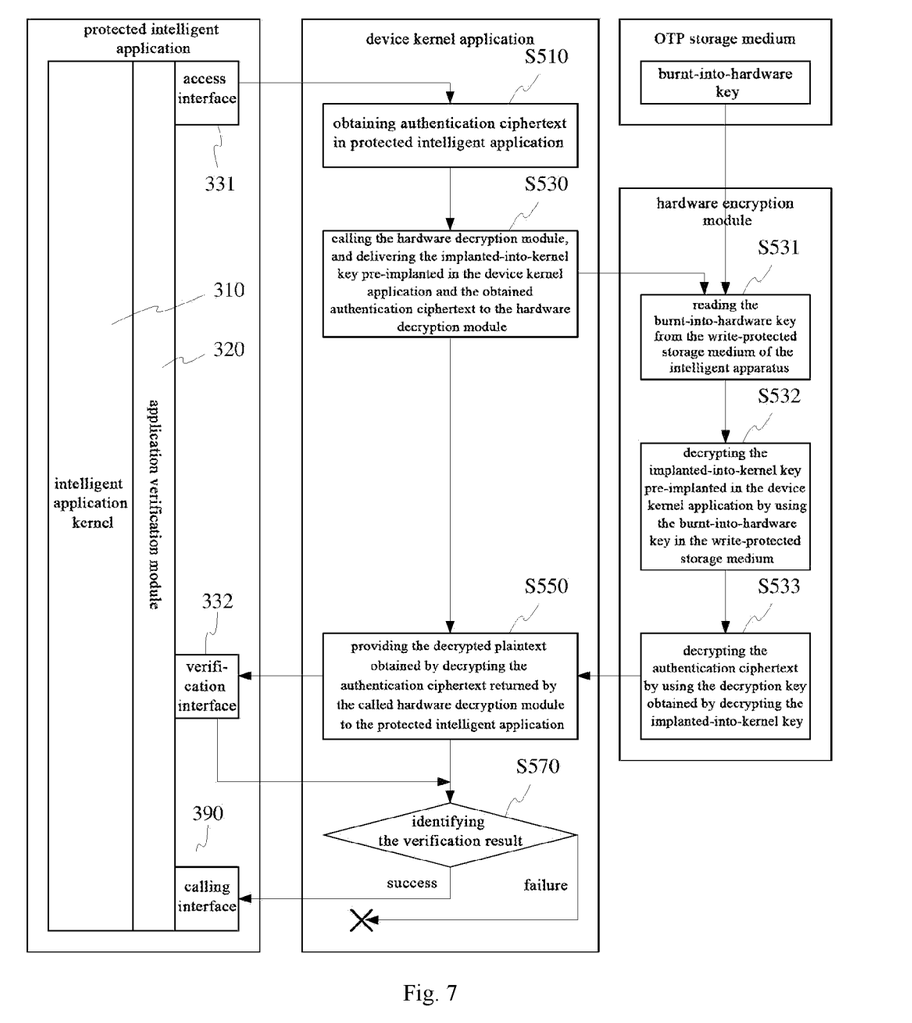
FIG. 7 is an example flow diagram of the method for calling permission verification as shown in FIG. 5 in the present application.

FIG. 7 is an exemplary flow diagram of the method for calling permission verification as shown in FIG. 5. Referring to FIG. 7, the protected intelligent application comprises an intelligent application kernel 310, an application verification module 320, an access interface 331 and a verification interface 332 that grant access permission to the device kernel application, and a calling interface 390 that provides limited access permission to the device kernel application.

Wherein, the access interface 331, the verification interface 332 and the calling interface 390 can be an API (Application Programming Interface), the authentication ciphertext implanted in the protected intelligent application with unrestricted access can be integrated in the access interface 331, and the authentication plaintext implanted in the protected intelligent application in the way of preventing access from the device kernel application can be integrated in the application verification module 320 in a hidden manner.

Accordingly, in FIG. 7, the device kernel application can obtain the authentication ciphertext by reading the access interface 331 of the protected intelligent application at S510, and the device kernel application can send the decrypted plaintext to the verification interface 332 at S550 so that the application verification module 320 in the protected intelligent application can verify the consistency between the decrypted plaintext and the sample plaintext, so as to determine whether to grant calling permission to the device kernel application.

In addition, in FIG. 7, the method for calling permission verification can further comprise, after S550, S570 executed by the device kernel application: receiving the verification result returned by the protected intelligent application (application verification module 320), and identifying the verification result to determine whether it is granted to call the protected intelligent application, that is, whether it can obtain a success calling response to the intelligent application kernel 310 by accessing the calling interface 390.

Figure 8:
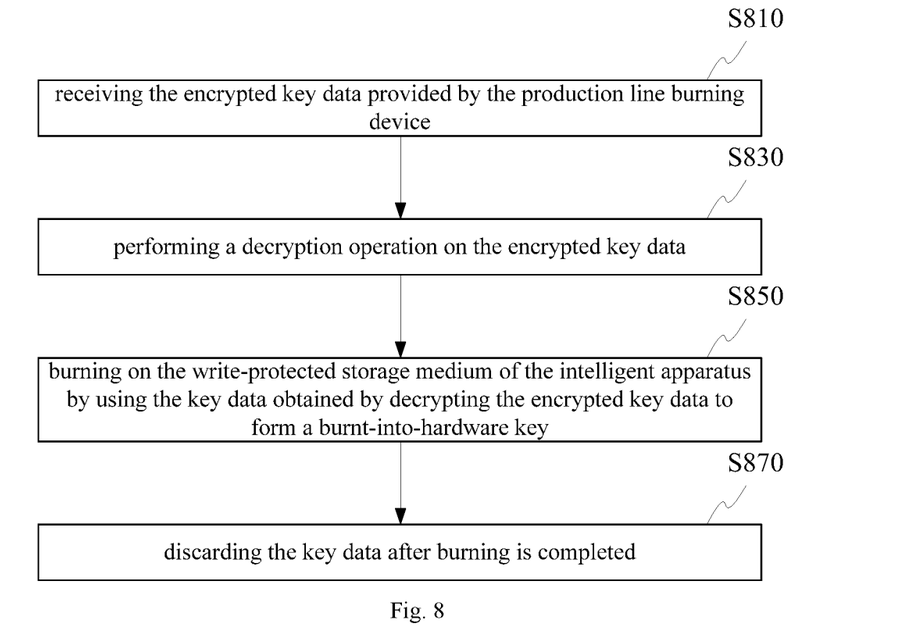
FIG. 8 is an extended flow diagram of the method for calling permission verification as shown in FIG. 5 in the present application which supports the legal key deployment example as shown in FIG. 2.

FIG. 8 is an extended flow diagram of the method for calling permission verification as shown in FIG. 5 to support the legal key deployment example as shown in FIG. 2. Referring to FIG. 8, before the protected intelligent application is loaded into the intelligent apparatus (for example, the intelligent apparatus is in the production line manufacturing stage), the method for calling permission verification of the protected intelligent application in this embodiment may comprise the following steps performed by the device kernel application of the intelligent apparatus:

S810: receiving the encrypted key data provided by the production line burning device.

S830: performing a decryption operation on the encrypted key data.

S850: burning on the write-protected storage medium of the intelligent apparatus by using the key data obtained by decrypting the encrypted key data to form a burnt-into-hardware key.

Wherein, when the encrypted key data provided by the production line burning device comes from the key server, the key data obtained by decrypting the encrypted key data is the first controlled key Key_root.

Moreover, as a further optional optimization solution, the access permission of the production line burning device to the key server can be authenticated by the hot-plug encryption device (such as encryption dog) plugged into the production line burning device.

S870: discarding the key data after burning is completed.

In addition, as a further optional solution, the method for calling permission verification of the protected intelligent application in this embodiment may comprise, before S810, a step performed by the device kernel application of the intelligent apparatus: providing the production line burning device with verification information pre-implanted in the device kernel application in response to the verification detection of the production line burning device.

Figure 9:
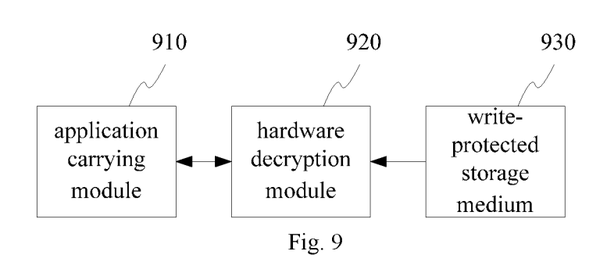
FIG. 9 is an exemplary schematic structural diagram of an intelligent apparatus in an embodiment of the present application.

FIG. 9 is an exemplary schematic structural diagram of an intelligent apparatus in an embodiment. Referring to FIG. 9, in this embodiment, the intelligent apparatus (which can be presented as a smart card) comprises an application carrying module 910, a hardware decryption module 920, and a write-protected storage medium 930 (e. g., an OTP storage medium).

The application carrying module 910 is configured to load and run the device kernel application, and when the protected intelligent application is recorded in the application carrying module, the device kernel application is configured to perform the method for calling permission verification as described in the above embodiment, that is, to execute the process shown in FIG. 5 or FIG. 7, and to further execute the process shown in FIG. 8.

The hardware decryption module 920 is used to provide decryption assistance for the device kernel application loaded in the application carrying module 910, that is, to perform the steps S531, S532 and S533 in the process shown in FIG. 5 or FIG. 7.

The burnt-into-hardware key is burned in the write-protected storage medium 930. For example, the burnt-into-hardware key can be burned in the write-protected storage medium 930 through the process shown in FIG. 8.

When implementing the above intelligent apparatus, the application carrying module 910, the hardware decryption module 920 and the write-protected storage medium 930 (such as the OTP storage medium) can be integrated in the same IC (integrated circuit) chip.

The intelligent apparatus can further comprise a non-transitory computer-readable storage medium, which can be independent of the IC chip integrated with the application carrying module 910, the hardware decryption module 920 and the write-protected storage medium 930, and the non-transitory computer-readable storage medium can store instructions, some of which, when executed by a processor such as the IC chip, cause the processor such as the IC chip to load the device kernel application (loaded into the application carrying module 910) and then to trigger the device kernel application to perform the method for calling permission verification as described in the above embodiment, that is, to perform the process shown in FIG. 5 or FIG. 7, and further to perform the process shown in FIG. 8.

Other instructions for a processor such as the IC chip to load the protected intelligent application (loaded to the application carrying module 910) can also be imported into the non-transitory computer-readable storage medium.

The algorithm used by the hardware decryption module 920 to realize the decryption process can be fixed in the hardware decryption module 920 in advance, rather than be achieved by loading the program from a non-transitory computer-readable storage medium.

In the present application, the technical features in each optional solution can be combined to form solutions as long as they are not exclusive, and these solutions are within the scope of the disclosure of the present application. The relationship terms such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a" or "include(s) a" do not exclude that there are other identical elements in the processes, methods, articles, or devices which comprise these elements. Each embodiment in this description is described in a relevant way. Each embodiment focuses on the differences from other embodiments. The same and similar parts of each embodiment can be referred to each other.

The description is only for preferred embodiments of the present application, and is not intended to limit the present application. Any modifications, substitutions, improvements, etc., which are made within the spirit and principles of the present application, will fall into the protection scope of the present application.

What is claimed is:

1. A method for calling permission verification of a protected intelligent application, wherein when the protected intelligent application is loaded into an intelligent apparatus, the method for calling permission verification comprises following steps performed by a device kernel application of the intelligent apparatus:

obtaining authentication ciphertext in the protected intelligent application;

calling a hardware decryption module, and delivering an implanted-into-kernel key pre-implanted in the device kernel application and the obtained authentication ciphertext to the hardware decryption module, so that the hardware decryption module decrypts the implanted-into-kernel key by using a burnt-into-hardware key in a write-protected storage medium of the intelligent apparatus, and decrypts the authentication ciphertext by using a decryption key obtained by decrypting the implanted-into-kernel key; wherein, when the implanted-into-kernel key is a secondary authentication key obtained by encrypting a second controlled key with a first controlled key and when the burnt-into-hardware key is the first controlled key, a decryption key obtained by decrypting the implanted-into-kernel key is the second controlled key; and providing decrypted plaintext obtained by decrypting the authentication ciphertext returned by the called hardware decryption module to the protected intelligent application, so that the protected intelligent application decides whether to grant calling permission to the device kernel application by verifying consistency between the decrypted plaintext and sample plaintext; wherein the authentication ciphertext is obtained by encrypting the sample plaintext with the second controlled key, when the decryption key obtained by decrypting the implanted-into-kernel key is the second controlled key, the decrypted plaintext obtained by decrypting the authentication ciphertext is consistent with the sample plaintext inaccessible by the device kernel application in the protected intelligent application.

2. The method for calling permission verification of claim 1, wherein the authentication ciphertext is obtained by performing deceptive encryption on the sample plaintext with the secondary authentication key as an input key and the second controlled key as a real key.

3. The method for calling permission verification of claim 1, wherein;
the secondary authentication key is obtained by performing a first encryption algorithm based encryption operation on the second controlled key with the first controlled key;
the authentication ciphertext is obtained by performing a second encryption algorithm based encryption operation on the sample plaintext with the second controlled key;
the hardware decryption module uses the burnt-into-hardware key to perform a first decryption algorithm based decryption operation on the implanted-into-kernel key, and uses the decryption key obtained by decrypting the implanted-into-kernel key to perform a second decryption algorithm based decryption operation on the authentication ciphertext; and
wherein the first decryption algorithm is a reverse algorithm of the first encryption algorithm, and the second decryption algorithm is a reverse algorithm of the second encryption algorithm.

4. The method for calling permission verification of claim 3, wherein the authentication ciphertext is obtained by performing a first decryption algorithm based deceptive encryption on the sample plaintext, wherein the deceptive encryption uses the first controlled key to perform the first decryption algorithm based decryption operation on an input key, and uses a deception key obtained by decrypting the input key as a real key to perform the second encryption algorithm based encryption operation.

5. The method for calling permission verification of claim 1, wherein before the protected intelligent application is loaded into the intelligent apparatus on which the device kernel application runs, the method for calling permission verification further comprises following steps performed by the device kernel application of the intelligent apparatus:
receiving encrypted key data provided by a production line burning device;
performing a decryption operation on the encrypted key data;
burning on the write-protected storage medium of the intelligent apparatus by using key data obtained by decrypting the encrypted key data to form a burnt-into-hardware key; wherein, when the encrypted key data provided by the production line burning device comes from a key server, the key data obtained by decrypting the encrypted key data is the first controlled key; and
discarding the key data after burning is completed.

6. The method for calling permission verification of claim 5, wherein access permission of the key server by the production line burning device is authenticated by a hot-plug encryption device plugged into the production line burning device.

7. The method for calling permission verification of claim 5, wherein before receiving the encrypted key data provided by the burning device, the method further comprises:
providing the production line burning device with verification information pre-implanted in the device kernel application in response to verification detection of the production line burning device.

8. The method for calling permission verification of claim 2, wherein:
a control right of the first controlled key belongs to a first controller;
a control right of the second controlled key belongs to a second controller which is different from the first controller; and
the first controller and the second controller are both different from a first developer to which the device kernel application belongs and a second developer to which the protected intelligent application belongs.

9. The method for calling permission verification of claim 1, wherein the write-protected storage medium of the intelligent apparatus is a one-time programmable (OTP) storage medium.

10. An intelligent apparatus comprising: a processor that executes an application carrying module, a hardware decryption module and a write-protected storage medium, wherein the application carrying module is configured to load and run a device kernel application, and the device kernel application is configured to perform the method for calling permission verification according to claim 1 when the protected intelligent application is recorded in the application carrying module.

11. A non-transitory computer-readable storage medium, which stores instructions that, when executed by a processor, cause the processor to load a device kernel application and trigger the device kernel application to perform the method for calling permission verification according to claim 1.

* * * * *